United States Patent [19]

Hambrecht et al.

[11] 4,291,134

[45] Sep. 22, 1981

[54] MOLDING MATERIALS CONTAINING STYRENE/ACRYLONITRILE COPOLYMERS AND ETHYLENE OXIDE/PROPYLENE OXIDE THREE-BLOCK COPOLYMERS

[75] Inventors: Jürgen Hambrecht, Neckargemuend-Dilsberg; Gerhard Lindenschmidt, Leimen; Walter Regel, Mutterstadt, all of Fed. Rep. of Germany

[73] Assignee: BASF Aktiengesellschaft, Fed. Rep. of Germany

[21] Appl. No.: 138,536

[22] Filed: Apr. 9, 1980

[30] Foreign Application Priority Data

Apr. 25, 1979 [DE] Fed. Rep. of Germany ...... 2916668

[51] Int. Cl.³ .................... C08L 25/12; C08L 71/02
[52] U.S. Cl. .................................. 525/92; 525/187
[58] Field of Search ....................... 525/88, 92, 187

[56]        References Cited
        U.S. PATENT DOCUMENTS

| 3,450,794 | 6/1969 | Ebneth et al. | 260/876 |
| 3,652,734 | 3/1972 | Farber et al. | 525/187 |
| 3,991,020 | 11/1976 | Alvares et al. | 525/187 |
| 4,159,975 | 7/1979 | Praetorius et al. | 525/187 |

FOREIGN PATENT DOCUMENTS 1244398 7/1967 Fed. Rep. of Germany .
1297341 6/1969 Fed. Rep. of Germany .
1239902 7/1960 France .
1018262 1/1966 United Kingdom .

Primary Examiner—Carman J. Seccuro
Attorney, Agent, or Firm—Keil & Witherspoon

[57]           ABSTRACT

Molding materials containing styrene-acrylonitrile copolymers, in which an additional essential ingredient is from 0.1 to 2.0% by weight, based on the copolymer, of a three-block polymer X-Y-X, where X is a terminal ethylene oxide block and Y is a central propylene oxide block. The proportion of terminal ethylene oxide blocks X, based on block copolymer, is from 5 to 20% by weight, while the central propylene oxide block Y has a number-average mean molecular weight of from 700 to 3,000 and its proportion is from 80 to 95% by weight, based on block copolymer. The number-average molecular weight of the sum of the two terminal blocks X is from 140 to 1,000.

The novel molding materials may be used for the manufacture of moldings, since the three-block copolymer X-Y-X advantageously influences the processing characteristics of styrene-acrylonitrile copolymers, and in particular broadens the range of conditions under which they may be injection-molded, without adversely affecting the mechanical properties of the styrene-acrylonitrile copolymers. Accordingly, the injection molding scrap rate can be kept very low.

3 Claims, No Drawings

MOLDING MATERIALS CONTAINING STYRENE/ACRYLONITRILE COPOLYMERS AND ETHYLENE OXIDE/PROPYLENE OXIDE THREE-BLOCK COPOLYMERS

The present invention relates to molding materials which contain styrene/acrylonitrile copolymers and also contain from 0.1 to 2.0% by weight, based on the said copolymers, of a three-block copolymer X-Y-X having a central propylene oxide block Y and two terminal ethylene oxide blocks X. The three-block copolymers must conform to certain conditions both in respect to the distribution of the blocks X and Y and in respect of the number-average molecular weight.

The prior art includes the following publications: (1) French Pat. No. 1,239,902, (2) British Pat. No. 1,018,262 and (3) U.S. Pat. No. 3,450,794.

(1) Discloses the use of ethylene oxide/propylene oxide three-block copolymers for rendering polymers antistatic, the block copolymers being used in amounts of from 3 to 12% by weight, based on the principal polymers. These known antistatic agents are intended to be used for polymethylmethacrylate, PVC, polyethylene, polystyrene and ABS molding materials (cf. of the above French patent, Abstract 2).

(2) Discloses that polymers may be rendered antistatic by means of ethylene oxide/propylene oxide copolymers which may have a random structure or a block structure. The Examples only substantiate the use of polyethylene glycols or of their derivatives, mostly as mixtures, of molecular weight ranging from 600 to 12,000, for rendering polyethylene antistatic.

(3) Discloses antistatic thermoplastic molding materials which may contain from 1 to 10% by weight of a polypropylene glycol having a mean molecular weight of from 2,000 to 5,000. The Examples indicate that polypropylene glycols are in most cases used in amounts of from 4 to 6% by weight, based on the molding material.

It is an object of the present invention to provide styrene/acrylonitrile copolymers which have good processing characteristics for injection molding. Styrene/acrylonitrile copolymers become progressively more difficult to process as their molecular weight increases. This is particularly true of injection molding. Their shortcomings are that the range of conditions under which they can be processed (i.e. the processing latitude) is narrow, and that mold release is difficult. The processing latitude is described as narrow if the injection pressure for the production of flawless moldings can only be varied within a narrow range. Characteristic processing flaws which are attributable both to the narrow processing latitude, and the mold overfilling and underfilling resulting therefrom, and to unsatisfactory mold release are flaking spots, flaking cracks, and cracks at gates, corners and bottoms.

It is an object of the present invention to provide additives, compatible with styrene/acrylonitrile copolymers, which improve the processing characteristics of such copolymers, ie. which, in particular, broaden the processing latitude without having the disadvantage of substantially detracting from the mechanical properties of the copolymers.

We have found that this object is achieved, according to the invention, if a linear three-block copolymer of a certain structure and a certain molecular weight is added to the styrene/acrylonitrile copolymer in an amount of at most 2% by weight, and preferably at most 1.5% by weight, based on the total mixture of copolymer and three-block copolymer.

A skilled worker would not have been able to deduce, from publications (1), (2) and (3) that the antistatic agents described in these publications would improve the processability of certain styrene/acrylonitrile copolymers, for injection molding, in the sense of providing an internal lubrication.

Thus, (1) discloses the use of from 3 to 12% by weight, based on polymer, of the additives mentioned in the said publication. These amounts are so large that, in particular, the heat distortion resistance of the base polymer is reduced. Furthermore, the water-solubility of the additives is so high that they can be washed out when in contact with water. Publication (2) teaches that with increasing molecular weight of the ethylene oxide/propylene oxide block polymers or copolymers the compatibility with thermoplastics increases if the proportion of ethylene oxide is high. On the other hand, if the proportion of propylene oxide in the block copolymer is high, precisely the reverse effect is found. This can also be deduced from (3). The propylene oxides mentioned in (3) are, however, completely incompatible, at the stated concentrations, with unmodified styrene/acrylonitrile copolymers, as is shown by a marked cloudiness.

It is therefore surprising to those skilled in the art that the block copolymers to be used according to the present invention are sufficiently compatible with styrene/acrylonitrile copolymers even when the block copolymers have molecular weight of up to 4,000, and that the water absorption of the styrene/acrylonitrile copolymers is not adversely increased. Surprisingly, ethylene oxide/propylene oxide three-block copolymers used according to the invention exhibit their full effect, in respect of the processing characteristics of styrene/acrylonitrile copolymers, when used in amounts of only from 0.3 to 1.5% by weight.

The use of the lubricants according to the invention at other, lower, concentrations than those at which, for example, antistatic agents are employed has the effect that the mechanical properties of the styrene/acrylonitrile copolymers remain virtually unchanged. Furthermore, it ensures that the lubricants do not migrate out of the novel molding materials.

Accordingly, the present invention relates to molding materials which contain

A. styrene/acrylonitrile copolymers and

B. three-block copolymers X-Y-X, which copolymers contain $b_1$. a central block Y which substantially consists of propylene oxide units and has a number-average means molecular weight of up to 3,000, and $b_2$. at each of the two ends, at least one block X, consisting substantially of ethylene oxide units, the proportion of $b_2$, based on three-block copolymer, being less than 85% by weight, with or without C. effective amounts of other, conventional additives, wherein the styrene/acrylonitrile copolymers A substantially consist of ($a_1$) from 20 to 35% by weight of acrylonitrile units and ($a_2$) from 80 to 65% by weight of styrene units and/or α-methylstyrene units, component B is present in an amount of from 0.1 to 2% by weight, based on the sum of A and B, and the proportions of $b_1$ and $b_2$, based on the three-block copolymer X-Y-X, are (b₁) from 80 to 95% by weight and (B₂) from 5 to 20% by weight, whilst the number-average mean molecular weight of (b₁) is greater than 700 and the number-average means molecular weight of the sum of the X blocks (b₂) is from 140 to 1,000.

Compared to conventional, low molecular weight internal lubricants, such as low molecular weight fatty alcohols and mineral oils, which are effective in small amounts, the block copolymers X-Y-X used according to the invention have the advantage that they do not exude, whilst compared with additives which has been disclosed, for example in (1), for antistatic treatment, they can be used in smaller amounts, so that the mechanical properties of the copolymer A are not adversely affected. Compared to the antistatic agents disclosed in (1), the three-block copolymers used according to the invention result in a broader processing latitude (compare Table 1). In the present context, the processing latitude is to be understood as the range of pressures within which the moldings do not show any flaws. At the bottom end of the range, a limit is imposed by the injection pressure at which the moldings do not show sink marks. The upper limit is the maximum injection pressure at which the moldings can still be released from the molds; above this limit, the mold is over-filled. The broader this range, the better the processability of a polymer, i.e. the fewer difficulties its processing presents. A great latitude is desirable so as to minimize the molding scrap rate in the event of pressure fluctuations or of fluctuations (inhomogeneities) in properties of the molding material.

Component A

Rubber-free styrene/acrylonitrile copolymers are used in the molding materials according to the invention; they substantially consist of copolymers containing from 20 to 35% by weight of acrylonitrile and from 80 to 65% by weight of styrene. To improve the heat distortion resistance, the styrene component can be entirely or partially replaced by α-methylstyrene. Styrene/acrylonitrile copolymers are commercially available and may be prepared, for example, by the methods disclosed in German Published Application DAS No. 1,001,001 or German Pat. NO. 1,003,436. The weight-average molecular weight $\overline{M}_w$ of the copolymers, as measured by light scattering methods, can range from $10^5$ to $2.5 \times 10^5$.

Component B

Component B of the novel molding materials preferably is a linear three-block copolymer. The linear three-block copolymers X-Y-X are used in amounts of from 0.1 to 2.0% by weight, more especially from 0.3 to 1.5% by weight, based on components A and B of the molding material. Within the range of from 0.3 to 1.1% by weight, these constituents display their full effectiveness in respect of the processing characteristics of the styrene/acrylonitrile copolymers, and have virtually no adverse effect on the mechanical properties of the copolymers. At higher contents, starting from about 1.5% by weight, the processing latitude begins to narrow; it also does so if the amount added is less than 0.1% by weight. A somewhat similar effect is observed if the molecular weight of the central polypropylene oxide block rises above 3,000.

The linear three-block copolymers are prepared in a conventional manner (N. Schönfeldt, Grenzflächenaktive Äthylenoxid-Addukte, Wissenschaftliche Verlagsgesellschaft mbH, Stuttgart, 1976, page 53) by polymerization; first a central polypropylene oxide block Y of number-average molecular weight from 700 to 3,000, especially from 900 to 2,000, is prepared; at both ends thereof, preferably one ethylene oxide block is then formed. For the purpose of the invention, the molecular weight of the blocks X and Y is the number-average molecular weight $\overline{M}_n$, determined, for example, from the OH number (Cf. DIN No. 53,240).

Preferably, linear three-block copolymers built up from homopolymer blocks are used.

The proportion of the two terminal blocks $b_2$ is the block copolymer is from 5 to 20% by weight, preferably from 10 to 15% by weight, whilst the proportion of the central polypropylene oxide block (Y) $b_1$ is from 95 to 80% by weight, preferably from 90 to 85% by weight.

Constituent B can be incorporated into the copolymer A by any method known in the art. In particular, mixing constituents A and B and polymerizing component A in the presence of component B, have proved suitable methods.

Additives C

The molding materials according to the invention may or may not contain other, conventional additives, though these are preferably absent. Examples of such conventional additives are dyes, stabilizers, organic and inorganic pigments and fillers. The effectiveness of the processing assistants is independent of these additives.

The additives C are employed in whatever amounts are effective, such amounts being known to those skilled in the art; they may, for example, be incorporated conjointly with component B into component A of the molding material.

It is to be noted that the three-block copolymers used according to the invention improve the processing characteristics of styrene/acrylonitrile copolymers without substantially altering the melt index, ie. the viscosity at zero shear. It is known that the addition of internal lubricants in general raises the melt index of the basic polymer. Surprisingly, this is not the case in the present instance. It can be concluded, from the available experimental results, that should the melt index of a molding material according to the invention be increased, its processing characteristics would become less good (see, for example, Table 1, Experiment 7).

The Examples and Comparative Experiments which follow illustrate the invention. In the Examples, parts and percentages are by weight, unless there is a statement to the contrary.

EXAMPLE 1

A styrene/acrylonitrile copolymer having a mean molecular weight $\overline{M}_w$ of 200,000 was used for each of Experiments 1 to 12.

Other additives, such as external lubricants, stabilizers, pigments and the like, were not used. The copolymers were compounded with the amounts of lubricants shown in Table 1, column 1, in an extruder at 240°–260° C. Table 1 also shows the proportion of the ethylene oxide block (EO) and of the central propylene oxide block (PO) in the linear three-block copolymer (component B). A further column shows the mean molecular weight ($\overline{M}_n$) of the central propylene oxide block. The subsequent columns show the processing temperatures in °C. and the optimum injection pressure, in bar, found at these processing temperatures. These in turn are followed by a column in which the processing range in bar is shown for the particular processing temperature and for the optimum injection pressure found. The final column of the Table contains notes on, for example, any damage to the injection moldings obtained.

The experiments were carried out on a Krauss Maffei Type KM 265-1120 screw injection molding machine, the molding produced being a refrigerator box having the following technical data:
 mean weight of molding (g of SAN) 150
 size of molding (external)
 length/width/height (mm) 240/120/72
 maximum flow path FP/mean wall thickness WT (mm) 200/2.0
 FP/WT ratio 100:1
 type of sprue and size: cone (mm) 4.6/5.4 $\phi$, length 22

The experiments were carried out using the following machine settings:

| Temperature settings in the plasticizing cylinder (°C.) conditions used for the individual shots | - 170/180/180/180/180 |
|---|---|
| | - 200/200/200/200/200 |
| | - 200/220/220/220/220 |
| | - 200/230/230/230/230 |
| | - 200/240/240/240/240 |
| | - 200/250/250/250/250 |
| Temperature of intake zone 30° C. | |
| Temperature in mold (°C.) | |
| bottom of female mold half | 50 |
| sides of female mold half | 50 |
| male mold | 50 |
| ejector ram | 50 |
| back pressure (bar) | 56 |
| injection time and holding-pressure time (sec) | 10 |
| cooling time (sec) | 14 |
| pause time (sec) | 3 |
| total cycle time (sec) | 35.5 |
| screw speed (l/min) | 100 |

The experimental results, shown in Table 1, indicate that the processing characteristics of styrene/acrylonitrile copolymers which, in accordance with the invention, contain the lubricant (component B) are such that a substantially broader processing latitude can be used than for copolymers which do not contain this additive. In particular, the results of Experiments 2 to 5 and 9 (including Experiments 6 and 10, which latter already amount to less good embodiments) should be compared with the results of Experiments 1, 7, 8, 11 and 12. It also follows from the results in Table 1 that too high a molecular weight of the central propylene oxide block narrows the processing latitude (cf. Experiment 11). The same is the case if, near the limits of the claimed composition, the molecular weight of the central block is high (Experiment 10) or when, at a low molecular weight, the proportion of the linear block copolymer amounts to about 2% by weight (compare Experiment 6). The Table also shows that the novel molding materials have a broader processing latitude than molding materials which do not contain any lubricant (Experiment 1) or which contain a lubricant which falls within the claimed molecular weight range but does not contain any ethylene oxide blocks (compare Experiment 12).

COMPARATIVE EXPERIMENTS 1-7

The Comparative Experiments shown in Table 2 are intended to substantiate the fact that the linear block copolymers used according to the invention do not exhibit a sufficient antistatic effect even when used in amounts of up to 5% by weight, based on the styrene/acrylonitrile copolymer described in Example 1.

To determine the antistatic properties, discs (of diameter 120 mm and thickness 4 mm), compression-molded at 200° C., were used to determine the surface resistivity in accordance with DIN 53,482 and the frictional electrostatic charge, by a method based on DIN 53,486. Cotton was used to rub the sample. The measurements are shown in Table 2.

The antistatic properties are characterized in terms of the half-life $t_h$ (in seconds), i.e. the time in which half the charge applied dissipates, and in terms of the amount of charge dissipated within the first 15 minutes after completing the charging-up process, $\Delta E$ in [%]. The antistatic effect was assessed in accordance with the notes given in DIN 53,486. This assessment by the friction method corresponds to the results of the dust chamber test. To carry out the dust chamber test, specimens stored for 24 hours under standard hermetically controlled conditions are then stored in a dust chamber in which dust is stirred up for 10 seconds. Lightly adhering dust was blown off the specimen in a slight stream of air. The formation of dust figures was assessed visually. In the Experiments of which the results are given in Table 2 the styrene/acrylonitrile copolymer described in Example 1 was used. In Experiments 2 to 6, this copolymer was mixed with a linear three-block copolymer in which the terminal ethylene oxide blocks accounted for 10% by weight, and in which the mean molecular weight of the central polypropylene oxide block was 1,200 (type A). In Experiment 7, a three-block copolymer in which the central polypropylene oxide block had a molecular weight of 2,000 was used (type B). The amounts used ranged from 1 to 5% by weight, based on styrene/acrylonitrile copolymer. The styrene/acrylonitrile copolymer used in Experiment 1 did not contain any lubricant.

It follows from the results in Table 2 that the linear three-block copolymers used according to the invention do not produce an antistatic effect, of the type known from publication (1), even when they are used in an amount of 3.4 or 5%. On the other hand, about 1% by weight suffices to improve the processing latitude of styrene/acrylonitrile copolymers, even when the total proportion of ethylene oxide in the block copolymers is only just 10%.

It can be concluded from these Experiments that it was not obvious to use the antistatic agents, disclosed in (1), for achieving the object of the present invention. Nor was it to be expected that these antistatic agents could be modified in such a way that, at a different concentration range, and when used in particular styrene/acrylonitrile copolymers, they would result in an increase, surprising to a skilled worker, in the range of processing conditions which could be used in injection molding the said copolymers.

TABLE 1

| Experiment | % by weight of lubricant | EO content % by weight | PO content % by weight | Molecular weight $M_n$ | Processing temperature °C. | Optimum injection pressure [bar] | Processing range | Notes |
|---|---|---|---|---|---|---|---|---|
| 1 | — | — | — | — | 280 | 870 | 70 | Flaky spots |
|   |   |   |   |   | 260 | 1000 | 70 | Flaky fracture |
|   |   |   |   |   | 246 | 1100 | 70 | Cracks at sprue |
|   |   |   |   |   | 230 | 1290 | 50 | Cracks at bottom |
| 2 | 0.3 | 10 | 90 | 1200 | 280 | 880 | 90 | Flaky spots |
|   |   |   |   |   | 261 | 970 | 85 | Flaky fracture |
|   |   |   |   |   | 244 | 1080 | 80 |   |
|   |   |   |   |   | 230 | 1260 | 80 |   |
| 3 | 0.5 | 10 | 90 | 1200 | 278 | 870 | 100 | None |
|   |   |   |   |   | 256 | 980 | 100 |   |
|   |   |   |   |   | 244 | 1060 | 100 |   |
|   |   |   |   |   | 230 | 1220 | 120 |   |
| 4 | 0.75 | 10 | 90 | 1200 | 278 | 860 | 100 | None |
|   |   |   |   |   | 256 | 970 | 100 |   |
|   |   |   |   |   | 245 | 1050 | 100 |   |
|   |   |   |   |   | 230 | 1230 | 100 |   |
| 5 | 1.0 | 10 | 90 | 1200 | 278 | 840 | 130 | None |
|   |   |   |   |   | 258 | 960 | 110 |   |
|   |   |   |   |   | 245 | 1080 | 100 |   |
|   |   |   |   |   | 231 | 1250 | 100 |   |
| 6 | 2.0 | 10 | 90 | 1200 | 277 | 870 | 90 | None |
|   |   |   |   |   | 255 | 970 | 80 |   |
|   |   |   |   |   | 240 | 1070 | 70 |   |
|   |   |   |   |   | 227 | 1230 | 70 |   |
| 7 | 5.0 | 10 | 90 | 1200 | 275 | 810 | 5 | Virtually no |
|   |   |   |   |   | 259 | 850 | 5 | processing |
|   |   |   |   |   | 239 | 930 | 5 | latitude |
|   |   |   |   |   | 230 | processing not possible |   |   |
| 8 | 1.0 | 30 | 70 | 1700 | 278 | 870 | 70 | None |
|   |   |   |   |   | 257 | 950 | 70 |   |
|   |   |   |   |   | 242 | 1070 | 70 |   |
|   |   |   |   |   | 230 | 1220 | 70 |   |
| 9 | 1.0 | 10 | 90 | 2000 | 278 | 810 | 110 | None |
|   |   |   |   |   | 257 | 930 | 110 |   |
|   |   |   |   |   | 243 | 1030 | 110 |   |
|   |   |   |   |   | 229 | 1200 | 110 |   |
| 10 | 1.0 | 20 | 80 | 2500 | 277 | 830 | 70 | None |
|   |   |   |   |   | 257 | 950 | 80 |   |
|   |   |   |   |   | 246 | 1050 | 80 |   |
|   |   |   |   |   | 233 | 1210 | 90 |   |
| 11 | 0.2 | 20 | 80 | 3650 | 279 | 840 | 70 | None |
|   |   |   |   |   | 258 | 970 | 70 |   |
|   |   |   |   |   | 246 | 1070 | 70 |   |
|   |   |   |   |   | 233 | 1230 | 65 |   |
| 12 | 1.0 | 0 | 100 | 2000 | 263 | 920 | 50 | Flaky spots |
|   |   |   |   |   | 246 | 1080 | 40 | Flaky fracture |
|   |   |   |   |   | 230 | 1300 | 50 |   |

TABLE 2

| Experiment | Additive Type | Additive Amount % | Antistatic behaviour (friction method) $t_h$ [s] | Antistatic behaviour (friction method) $\Delta E[\%]$ | Assessment of antistatic effect | Dust chamber |
|---|---|---|---|---|---|---|
| 1 | — | — | >900 | 7 | insufficient | dust figures |
| 2 | A | 1 | >900 | 8 | " | dust figures |
| 3 | A | 2 | >900 | 13 | " | " |
| 4 | A | 3 | >900 | 13 | " | " |
| 5 | A | 4 | 820 | 48 | " | " |
| 6 | A | 5 | 80 | 82 | slight | no dust figures |
| 7 | B | 2 | >900 | 5 | insufficient | dust figures |

$t_H$ = half-life $$\Delta E = \left(\frac{E_e - E_{15}}{E_e}\right) \cdot 100$$

$E_e$ = charge after 50 rubs
$E_{15}$ = residual charge 15 minutes after reaching $E_e$.

We claim:
1. A molding material which contains
  A. styrene/acrylonitrile copolymers and
  B. three-block copolymers X-Y-X, which copolymers contain
   b1. a central block Y which substantially consists of propylene oxide units and has a number-average mean molecular weight of up to 3,000, and
   b2. at each of the two ends, at least one block X, consisting substantially of ethylene oxide units, the proportion of $b_2$, based on three-block copolymer, being less than 85% by weight, with or without
C. effective amounts of other, conventional additives, wherein the styrene/acrylonitrile copolymers A substantially consist of
($a_1$) from 20 to 35% by weight of acrylonitrile units and
($a_2$) from 80 to 65% by weight of styrene units and/or α-methylstyrene units, or a mixture of the said units, component B is present in an amount of from 0.1 to 2% by weight, based on the sum of A and B, and the proportions of $b_1$ and $b_2$, based on the three-block copolymer X-Y-X, are ($b_1$) from 80 to 95% by weight and
($B_2$) from 5 to 20% by weight,
whilst the number-average mean molecular weight of ($b_1$) is greater than 700 and the number-average mean molecular weight of the sum of the X blocks ($b_2$) is from 140 to 1,000.

2. A molding material as claimed in claim 1, wherein the amount of component B is not less than 0.3 and not more than 1.5% by weight.

3. A molding material as claimed in claim 1, wherein the number-average molecular weight of component $b_1$ is from 900 to 2,000 and the number-average molecular weight of component $b_2$ is from 200 to 500.